WILLIAM A. COGSWELL.
Improvement in Governor Valves for Steam Engines.
No. 115,577.　　　　　　　　　　　　　　Patented June 6, 1871.
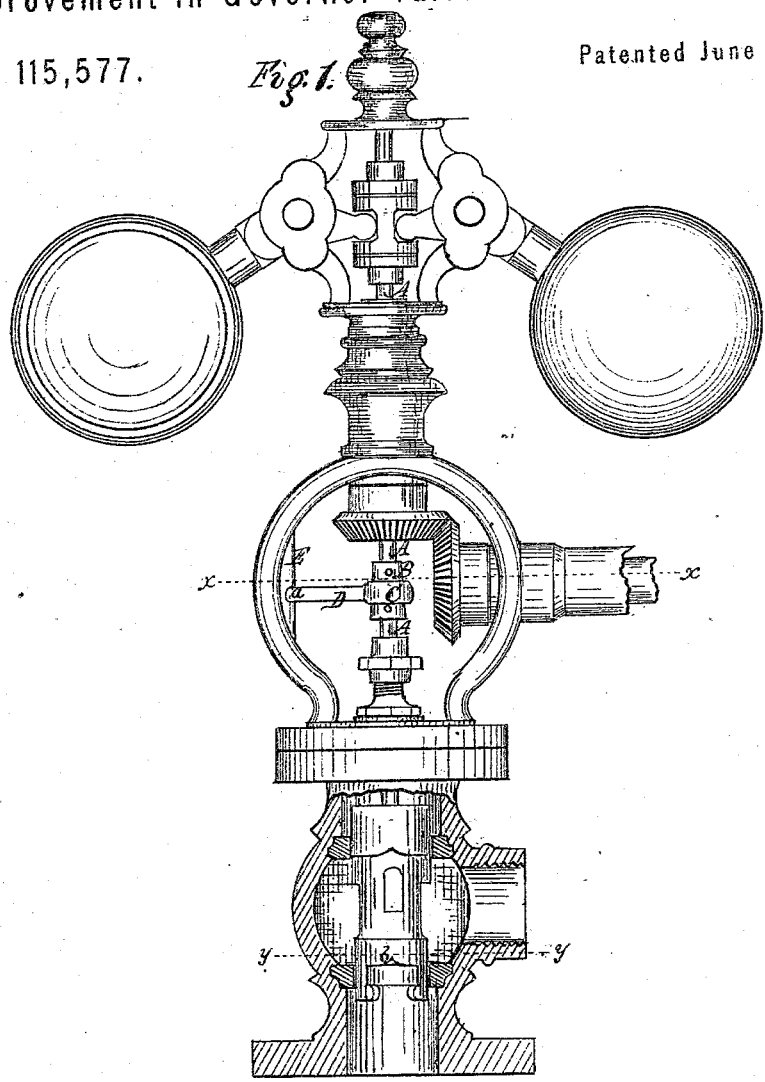
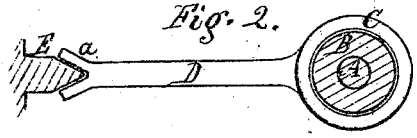
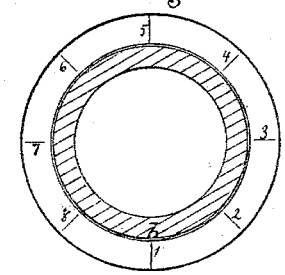
Witnesses.
R. F. Osgood
Archie Baine
Inventor:
Wm. A. Cogswell,
By J. Fraser & Co.
attys.

UNITED STATES PATENT OFFICE.

WILLIAM A. COGSWELL, OF ROCHESTER, NEW YORK, ASSIGNOR TO JUNIUS JUDSON, OF SAME PLACE.

IMPROVEMENT IN GOVERNOR-VALVES FOR STEAM-ENGINES.

Specification forming part of Letters Patent No. 115,577, dated June 6, 1871.

*To all whom it may concern:*

Be it known that I, WILLIAM A. COGSWELL, of the city of Rochester, in the county of Monroe and State of New York, have invented a certain new and useful Improvement in Governor-Valves for Steam-Engines, of which the following is a specification:

Nature of the Invention.

This invention consists of a clamp-sleeve combined with a conical collar upon the valve-rod for holding said rod from turning while in action, yet allowing its adjustment for changing the position of the valve, as hereinafter described.

General Description.

In the drawing, Figure 1 is a sectional elevation of my improved governor; Fig. 2, a cross-section in line *x x*, showing the clamp-ring and conical collar; Fig. 3, a cross-section in line *y y*, showing the method of adjusting the valve in its seat.

In general construction this governor is the same as Judson's graduating governor in common use, and requires no special description here.

The rod or spindle A, which connects the valve with the governor-balls, has secured upon it, in a suitable position, a conical collar, B. On this collar rests a conical ring, C, having an arm, D, which extends outward, and is made forked or branched so as to form a bearing, *a*, which runs loosely upon a stationary way or guide, E. When this ring is driven down tight on the collar it holds the rod or spindle from turning, but still allows it the vertical motion essential in operation. When driven up or loosened so as to release the collar, the rod or spindle may be turned to shift the position of the valve in its seat. This changing of the valve to different positions in its seats is necessary for the reason that the steam, under great pressure, cuts the seat at the point where it enters through the graduated openings *b b*. When badly cut or worn the valve is simply turned so that its graduated openings come opposite an unworn space of the seat again. This is indicated by the radial lines 1, 2, 3, &c., in Fig. 3.

The conical collar and ring above described constitute a simple and effective device for the purpose and, being open, and not inclosed, are easily reached and operated.

A pin projecting from the rod or spindle, and playing in a vertical slot of the frame, has been before known; but such is not the equivalent of this invention, for the reason that it only holds the rod from turning, and does not allow the adjustment of the valve, as herein described.

Claim.

What I claim, and desire to secure by Letters Patent, is—

The conical collar B and ring C provided with the arm D, when combined with the valve-rod A, in the manner and for the purpose specified.

WM. A. COGSWELL.

Witnesses:
R. F. OSGOOD,
ARCHIE BAINE.